2,854,443

ALYL-OXYTOCIN AND PROCESS FOR THE PREPARATION THEREOF

Roger Boissonnas, Geneva, Stephan Guttmann and Pierre-Alain Jaquenoud, Basel, and Jean-Pierre Waller, Geneva, Switzerland, assignors, by mesne assignments, to Saul & Co., Newark, N. J., as nominee of Fidelity Union Trust Company, executive trustee under Sandoz Trust No Drawing. Application October 8, 1956
Serial No. 614,380

Claims priority, application Switzerland October 12, 1955

3 Claims. (Cl. 260—112)

The present invention relates to a new oxytocic and to the preparation thereof.

The new oxytocic provided by this invention is a polypeptide-like compound which corresponds to the following formula:

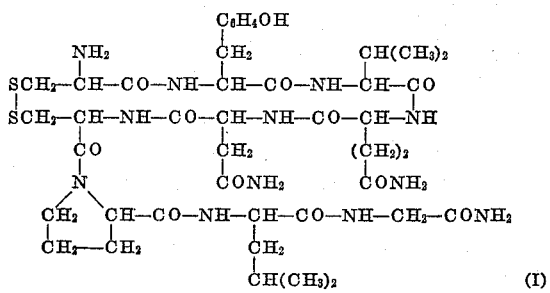

(I)

According to this invention, the aforesaid new oxytocic is prepared as follows:

(i) L-leucyl-glycinamide is acylated with N-carbobenzoxy-L-proline to give the N-carbobenzoxy-L-prolyl-L-leucyl-glycinamide;

(ii) The carbobenzoxy group of the so-obtained N-carbobenzoxy-L-prolyl-L-leucyl-glycinamide is then split off, yielding the tripeptide of the following formula:

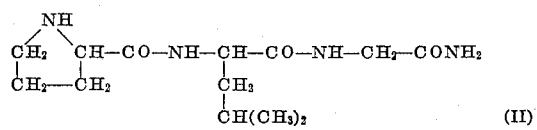

(II)

(iii) L - asparaginyl - S—R—L - cysteine - methylester, where R represents a group which has been introduced to protect the sulfhydryl group, e. g. a phenyl, benzyl, p-bromobenzyl, tolyl or p-xylyl group, is acylated with N-carbobenzoxy-L-glutamine, and the so-obtained N-carbobenzoxy-L-glutaminyl-L-asparaginyl - S—R—L - cysteine-methylester is then converted into the N-carbobenzoxy-L-glutaminyl-L-asparaginyl-S—R—L-cysteine-azide of the following formula:

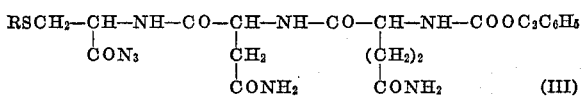

(III)

(iv) The so-obtained N-carbobenzoxy-L-glutaminyl-L-asparaginyl-S—R—L-cysteine-azide is then condensed with the tripeptide of Formula II to yield the N-carbobenzoxy-L-glutaminyl-L-asparaginyl-S—R—L-prolyl - L-leucyl-glycinamide, and the carbobenzoxy group is then split off the latter to give the hexapeptide of the following formula:

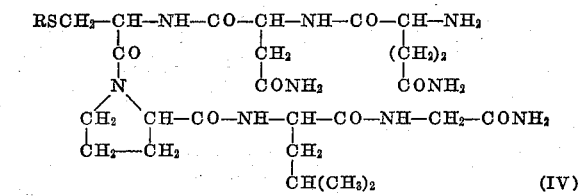

(IV)

(v) N—R'—S—R''—L-cysteinyl-L-tyrosine, where R' is a group—e. g. a benzenesulfonyl, toluenesulfonyl, carbophenoxy, carbobenzoxy or carbo-p-bromo-benzoxy group—which has been introduced to stabilize the amino group, and R'' is a group—e. g. a phenyl, benzyl, p-bromo-benzyl, tolyl or p-xylyl group—which has been introduced to protect the sulfhydryl group, is condensed with L-valine-methylester to give N—R'—S—R''—L-cysteinyl-L-tyrosyl-L-valine-methylester of the following formula:

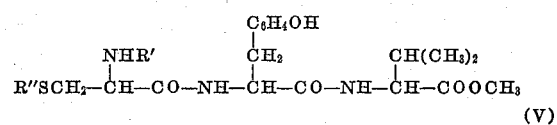

(V)

which is then converted into a reactive derivative of the free acid itself;

(vi) The said reactive derivative is then condensed with the hexapeptide of Formula IV to the nonapeptide of the following formula:

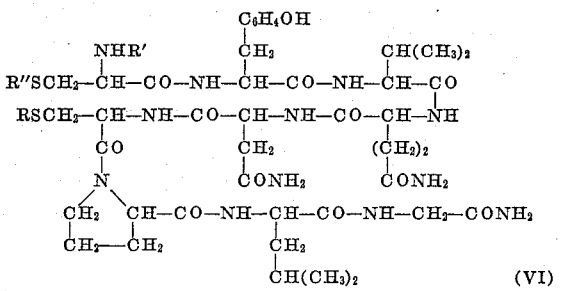

(VI)

(vii) The groups R, R' and R'' are then split off from the nonapeptide of Formula VI by reduction with an alkali metal, advantageously sodium or potassium in liquid ammonia, thus producing the nonapeptide: L-cysteinyl-L-tyrosyl-L-valyl-L-glutaminyl - L - asparaginyl-L-cysteinyl-L-prolyl-L-leucyl-glycinamide; and finally, (viii) The last-named nonapeptide is subjected to oxidation with air, in aqueous solution at a pH of 6 to 8 at room temperature (about 20 to about 30° C.), thereby yielding the desired end-product I.

Compound I of the present invention is an in vivo more strongly acting oxytocic than the synthetic compound of the following formula:

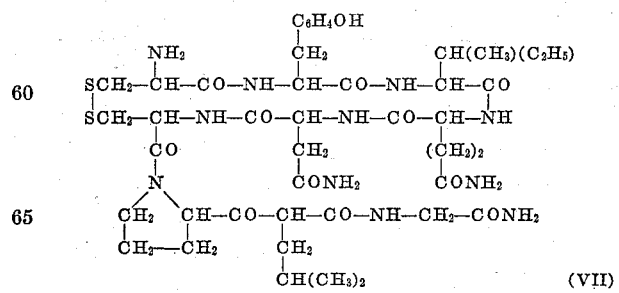

(VII)

which formula H. Tuppy (Biochem. Biophys. Acta 11, 449 [1953]) as well as V. du Vigneaud and coworkers (JACS 75, 4879 [1953]) have advanced for natural oxytocin. This action of Compound I could not be foreseen and is surprising, particularly since this compound, which has a strong action on the uterus is situ, shows a significantly weaker oxytocic action than oxytocin when tested only by the classical methods for the testing of oxytocics (contraction of the isolated uterus, blood pressure drop in the rooster).

The oxytocic of Formula I, which has a hormone-like action, may be obtained and employed in the form of a preparation containing the same. The in vivo stronger oxytocic action of the new compound, as such or in the form of a preparation, than a synthetic preparation of natural oxytocin, renders the former useful therapeutically in obstetrics and gynecology, for example to stimulate the motility of the uterus, to induce labor, to control postpartum hemorrhage, etc. Administration may take place orally, intravenously, etc.

The process of the invention may, in an exemplary embodiment thereof, be carried out, e. g. as follows: Glycinamide is treated with N-carbobenzoxy-L-leucine in the presence of chloroformic acid ester and a tertiary base, and the dipeptic, obtained after splitting off the N-carbobenzoxy group, is condensed in like manner with N-carbobenzoxy-L-proline into tripeptide form, the resulting tripeptide corresponding to Formula II, after splitting off the N-carbobenzoxy group. S-benzyl-L-cysteine-methylester is condensed with N-carbobenzoxy-L-asparagine in the presence of diethylchlorophosphite and a tertiary base, the N-carbobenzoxy group split off from the product, and the so-obtained L-asparaginyl-S-benzyl-L-cysteine-methylester treated with N-carbobenzoxy-L-glutamine in the presence of a chloroformic acid ester and a tertiary organic base, after which the resultant tripeptide ester is converted, with protection of the free amino group and of the sulfyhydryl group, into the azide which corresponds to Formula III. This azide is used to acylate the tripeptide II with production of a hexapeptide which, after splitting off of the N-carbobenzoxy group, corresponds to Formula IV. N-carbobenzoxy - S - benzyl - L - cysteinyl - L - tyrosyl - L-valine-methylester (V) is then built up by condensation of N-carbobenzoxy-S-benzyl-L-cysteinyl-L-tyrosine with L-valine-methylester, and the so-obtained product of Formula V is converted into the azide which is condensed with the hexapeptide IV, with formation of the nonapeptide VI, in which the two sulfhydryl groups are substituted with a benzyl radical, and the amino group of the end-positioned cysteinyl radical is substituted by the carbobenzoxy group. These radicals introduced for the purpose of protecting the enumerated functional groups, are split off by treating the nonapeptide with an alkali metal, advantageously sodium or potassium, in liquid ammonia, after which by oxidation with air in aqueous solution a cystine grouping forms from the two sulfhydryl groups. In this way, the cyclic octapeptide derivative of Formula I is obtained as end-product.

The process encompasses also the following procedural alternatives: In protecting the amino group of the end-positioned cysteinyl radical of Compound VI, instead of the carbobenzoxy group, other groups may also be employed, such for example as the carbobenzoxy, carbo-p-bromobenzoxy, toluenesulfonyl or benzenesulfonyl groups. Moreover, the process is not limited to the employment of L-cysteine derivatives, wherein the sulfhydryl group is stabilized by a benzyl radical but—with the same method and with like success—there may also be employed in place of S-benzyl-L-cysteine derivatives also the corresponding S-p-bromo-benzyl, S-phenyl, S-tolyl or S-p-xylyl derivatives. The process may also be modified in that, in building up nonapeptide VI, the N-carbobenzoxy - S - benzyl - L - cysteinyl - L - tyrosyl - L-valine-azide is not employed, but the methylester V is saponified to the free acid which together with the hexapeptide IV, in the presence of tetraethylpyrophosphite or of dicyclohexylcarbodiimide, also yields the nonapeptide VI.

The following examples set forth by way of illustration representative embodiments of the invention. In these examples, parts by weight bear the same relationship to parts by volume as do grams to cubic centimeters. Percentages are by weight. Temperatures are expressed in degree centigrade.

EXAMPLE 1

(a) L-prolyl-L-leucyl-glycinamide 88 parts by volume of triethylamine are added to a solution of 159 parts by weight of N-carbobenzoxy-L-leucine in 1200 parts by volume of tetrahydrofurane at room temperature, after which 63 parts by volume of ethyl chloroformate in 50 parts by volume of tetrahydrofurane are added at $-5°$, and then, after a lapse of 15 minutes, a freshly prepared solution of 66.4 parts by weight of glycinamide-hydrochloride in 330 parts by volume of 2-normal aqueous caustic soda is stirred in rapidly and vigorously. After 3 hours, the organic layer is evaporated under reduced pressure, the solution of the residue in 2000 parts by volume of ethyl acetate first shaken with the aqueous phase, then with dilute hydrochloric acid, and lastly washed with dilute aqueous ammonia. It is then dried over sodium sulfate, evaporated under reduced pressure, and the residue taken up in 1500 parts by volume of ether. Filtration of the precipitated crystals, to which is added a further quantity after evaporation of the mother liquor, yields a total of 130 parts by weight of N-carbobenzoxy-L-leucyl-glycinamide, M. P. 80°, $[\alpha]_D^{19} = -10.5°$ (c.=1.8; chloroform), which—dissolved in 500 parts by volume of a 2.5-normal solution of hydrogen bromide in glacial acetic acid—is allowed to stand at 20° for one hour. It is then evaporated to dryness under reduced pressure, the solution of the residue in 350 parts by volume of water is washed with ether and neutralized with solid sodium carbonate and then adjusted to a pH of 9.5 to 10.0 with the aid of 4-normal aqueous caustic soda, after which the solution is added to a freshly prepared mixture, obtained by adding first 58 parts by volume of triethylamine and then, at $-10°$, 41 parts by volume of ethyl chloroformate, to a solution of 103 parts by weight of N-carbobenzoxy-L-proline in 1200 parts by volume of tetrahydrofurane. The resultant emulsion has, after being kept for two hours at 20° while stirring, a pH of approximately 7. It is freed of tetrahydrofurane under reduced pressure, and extracted with a total of 2000 parts by volume of methylene chloride. The extract is washed first with cold dilute aqueous caustic soda solution and then with dilute hydrochloric acid, and then it is dried over sodium sulfate and evaporated to dryness. Dissolution of the residue in 200 parts by volume of warm ethyl acetate and cooling of the solution yields 112 parts by weight of N-carbobenzoxy - L-propyl - L - leucyl - glycinamide; M. P. 163°, $[\alpha]_D^{20} = -71.9°$ (c=2.5; ethanol).

To split off the carbobenzoxy group, the compound is dissolved in 350 parts by volume of a 2.5-normal solution of hydrogen bromide in glacial acetic acid, and the solution, after standing for one hour at 20°, is evaporated under reduced pressure. The solution of the residue in 150 parts by volume of water is shaken out with ether, diluted with 2000 parts by volume of water, treated with a sufficient quantity of freshly prepared Amberlite-IRA–410 base (ion exchange resin) to remove the hydrogen bromide, and evaporated under reduced pressure. The residue yields, upon trituration with ethyl acetate, 68 parts by weight of L-prolyl-L-leucyl-glycinamide with a melting point of 120°.

(b) N - carbobenzoxy-L-glutaminyl-L-asparaginyl-S-benzyl-L-cysteine-azide

First 200 parts by weight of thionyl chloride and then 250 parts by weight of S-benzyl-L-cysteine are added at $-10°$ to 800 parts by volume of methanol, the mixture allowed to stand for 6 hours at 45°, and then evaporated under reduced pressure. The solution of the residue in 300 parts by volume of methanol is diluted with 1000 parts by volume of ether and yields, after standing for one day at 0°, 224 parts by weight of S-benzyl-L-cysteine-methylester-hydrochloride of M. P. 150°, $[\alpha]_D^{21}=-13.9°$ (c.=2.9; water), which is added to a solution of 240 parts by volume of triethylamine in 3400 parts by volume of toluene. The mixture is rapidly heated to 55°, kept at 20° with stirring, then 128 parts by volume of diethyl-chlorophosphite added at 0° and the mixture heated for one hour at 80°. After cooling to 0°, the precipitated triethylamine-hydrochloride is filtered off, and the filtrate is added to a solution of 190 parts by weight of N-carbobenzoxy-L-asparagine in 580 parts by volume of diethylphosphite. The mixture is heated for two hours at 105°, cooled to 0°, and the precipitate filtered off. The precipitate is rapidly dissolved in 1250 parts by volume of boiling pyridine, 20,000 parts by volume of boiling water added, and the whole cooled. N-carbobenzoxy-L-asparaginyl-S-benzyl-L-cysteine-methylester crystallizes out in a yield of 130 parts by weight after washing with water. M. P. 196°, $[\alpha]_D^{19}=31.9°$ (c.=2.4; pyridine).

For splitting off the carbobenzoxy group, the compound is dissolved in 800 parts by volume of a 2.5-normal solution of hydrogen bromide in glacial acetic acid, and the solution, after standing for 1½ hours at 20°, is evaporated under reduced pressure. The solution of the residue in 300 parts by volume of water is shaken out with ether and then adjusted, by the addition of solid sodium carbonate, at a pH of 6.0 to 6.5. The entire solution is then poured into a mixture, which has been freshly prepared by the addition of 54 parts by volume of triethylamine and 36.6 parts by volume of ethyl chloroformate at 0° to a solution of 107 parts by weight of N-carbobenzoxy-L-glutamine in 1500 parts by volume of tetrahydrofurane and 1500 parts by volume of dioxane, and the reaction mixture is kept at room temperature for 4 hours with stirring, the pH being maintained at 5.5. After the addition of 14,000 parts by volume of ice water, the precipitated crystalline mass is filtered off, washed with water, and recrystallized by rapid dissolution in 2200 parts by volume of boiling pyridine, addition of 22,000 parts by volume of water to the solution and cooling, whereby 119 parts by weight of N-carbobenzoxy-L-glutaminyl-L-asparaginyl-S-benzyl-L-cysteine-methylester are obtained. M. P. 239°, $[\alpha]_D^{20}=-38.6°$ (c.=2.4; glacial acetic acid). These are suspended in 1800 parts by volume of methanol and 300 parts by volume of hydrazine hydrate and heated for 3 hours under reflux with vigorous stirring. 1400 parts by volume of water are added, the precipitated hydrazide filtered off and washed with water. Yield=108 parts by weight; M. P. 258°. The hydrazide is dissolved at —5° in 1350 parts by volume of glacial acetic acid and 180 parts by volume of 3-normal hydrochloric acid, after which 180 parts by volume of 1-molar aqueous sodium nitrite solution are added. After 5 minutes, 6000 parts by volume of ice water are added, the separated precipitate filtered off and carefully washed with water and then dried at 0° under reduced pressure over phosphorus pentoxide and potassium hydroxide. Yield=106 parts by weight of azide, M. P. 225°, which is forthwith further worked up as follows.

(c) *L-glutaminyl - L - asparaginyl-S-benzyl-L-cysteinyl-L-prolyl-L-leucyl-glycinamide*

106 parts by weight of N-carbobenzoxy-L-glutaminyl-L-asparaginyl-S-benzyl-L-cysteine-azide are dissolved in a solution of 50 parts by weight of L-prolyl-L-leucyl-glycinamide in 700 parts by volume of dimethylformamide, the solution allowed to stand for three days at 40° with stirring and then slowly evaporated under reduced pressure to half its volume, the separated precipitate filtered off and washed with ethyl acetate. Upon addition of ethyl acetate to the mother liquor, the latter yields a further small quantity of crystals.

To split off the carbobenzoxy group, the so-obtained 76 parts by weight of N-carbobenzoxy-L-glutaminyl-L-asparaginyl-S-benzyl-L-cysteinyl-L-propyl-L-leucyl-glycinamide (M. P. 208°) are dissolved in 540 parts by volume of a 2.5-normal solution of hydrogen bromide in glacial acetic acid and, after being allowed to stand for one hour at room temperature, the solution is evaporated under reduced pressure. The residue is triturated with ethyl acetate and acetone until it has become powdery. This powder is dissolved in 10,000 parts by volume of methanol and treated with freshly prepared and carefully methanol-washed free Amberlite-IRA–410 base to remove the hydrogen bromide. The solution is evaporated to dryness and the residue is triturated with ethyl acetate until 52 parts by weight of crystalline L-glutaminyl-L-asparaginyl-S-benzyl-L-cysteinyl-L-propyl-L-leucyl-glycinamide are obtained. M. P. 145°, $[\alpha]_D^{19}=-67.3°$ (c.=2.3; glacial acetic acid).

(d) *N-carbobenzoxy-S-benzyl-L-cysteinyl-L-tyrosyl-L-valine-methylester*

To a solution of 73 parts by weight of N-carbobenzoxy-S-benzyl-L-cysteinyl-L-tyrosine in 350 parts by volume of tetrahydrofurane there are added at room temperature 34 parts by volume of tri-n-butylamine and then, at —5°, 14.3 parts by volume of ethyl chloroformate. After 10 minutes, 19.5 parts by weight of freshly distilled L-valine-methylester are added and the mixture is kept at 0° for 1½ hours with stirring and then for 5 minutes at 50°. The reaction mixture is evaporated to dryness under reduced pressure, and the solution of the residue in ethyl acetate carefully washed with dilute hydrochloric acid and then with dilute aqueous ammonia. After drying the organic layer over sodium sulfate, petroleum ether is added, whereupon the N-carbobenzoxy - S - benzyl-L-cysteinyl-L-tyrosyl-L-valine-methylester separates as a crystalline precipitate. After recrystallization from ethyl acetate-petroleum ether, 59 parts by weight of crystalline compound are obtained, M. P. 132°, $[\alpha]_D^{19}=-36.4°$ (c.=2.0; methanol).

(e) *N - carbobenzoxy - S - benzyl-L-cysteinyl-L-tyrosyl-L - valyl - L - glutaminyl-L-asparaginyl-S-benzyl-L-cysteinyl-L-prolyl-L-leucyl-glycinamide*

59 parts by weight of N-carbobenzoxy-S-benzyl-L-cysteinyl-L-tyrosyl-L-valine-methylester are dissolved in 250 parts by volume of warm methanol, and then 50 parts by volume of hydrazine hydrate are added. After standing for three hours at 65°, the mass is poured into water, the precipitate washed with water until it contains no more hydrazine, and then dried in a high vacuum. The so-obtained 54 parts by weight of N-carbobenzoxy-S-benzyl-L-cysteinyl-L-tyrosyl-L-valine-hydrazide of melting point 242° are rapidly dissolved at 60° in a mixture of 260 parts by volume of 1-normal hydrochloric acid and 1700 parts by volume of glacial acetic acid. The solution is forthwith cooled to —5°, 93 parts by volume of 1-molar aqueous sodium nitrite solution added, and after 10 minutes 35,000 parts by volume of ice water added, after which the separated precipitate is filtered off. It is carefully washed with water and sodium bicarbonate solution and dried in a high vacuum over phosphorus pentoxide and potassium hydroxide. Yield=50 parts by weight of N-carbobenzoxy-S-benzyl-L-cysteinyl-L-tyrosyl-L-valine-azide, M. P. 125°. This is forthwith dissolved in 450 parts by volume of dimethylformamide, and 40 parts by weight of L-glutamyl-L-asparaginyl-S-benzyl-L-cysteinyl-L-prolyl-L-leucyl-glycinamide, prepared according to paragraph (c) of this example, added to the solution. The solution is then stirred for 90 hours at 20° and concentrated under reduced pressure to half its volume, after which 4000 parts of ethyl acetate are added. The flocculent precipitate which is thrown down is filtered off and carefully washed with ethyl acetate and then with methanol, after which 50 parts by weight of N-carbobenzoxy-S-benzyl-L-cysteinyl - L - tyrosyl-L-valyl-L-glutaminyl-L-asparaginyl-S-benzyl - L - cysteinyl-L-prolyl-L-leucyl-glycinamide—M. P. 232°—are obtained.

(f) Polypeptide Compound I

Metallic sodium or potassium is added to a solution of 10 parts by weight of N-carbobenzoxy-S-benzyl-L-cysteinyl-L-tyrosyl-L-valyl - L - glutaminyl-L-asparaginyl-S-benzyl-L-cysteinyl-L-prolyl-L-leucyl-glycinamide in 1250 parts by volume of dry liquid ammonia while stirring at the boiling point of the solution, until a permanent blue coloration is achieved. After the addition of 1.9 parts by weight of ammonium chloride, the solution is evaporated to dryness under reduced pressure, the residue—containing L - cysteinyl-L-tyrosyl-L-valyl-L-glutaminyl-L-asparaginyl-L-cysteinyl-L-prolyl - L - leucyl - glycinamide—dissolved in 20,000 parts by volume of 0.002-normal acetic acid, and oxidized at a pH of 6.5 to 7.0 by passing in air for 2 hours. The solution, which contains Compound I, is brought to a pH of 4.0 to 5.0, is filtered and, after the addition of 100 parts by weight of sodium chloride, is evaporated to dryness, whereby a dry powder is obtained which is of good stability. It can be stored and, when used, yields a clear solution, e. g. in water. However, the solution which contains Compound I may be directly used, if necessary or desired after dilution with water or a salt solution.

EXAMPLE 2

Sections (a), (b), (c) and (d) are followed as in Example 1. The N-carbobenzoxy-S-benzyl-L-cysteinyl-L-tyrosyl-L-valine-methylester is dissolved in 180 parts by volume of dioxane, 60 parts by volume of 4-normal aqueous caustic soda solution are added, and the mixture allowed to stand 1½ hours at 20°. After acidification, the saponified tripeptide crystallizes out, is filtered off, and is recrystallized from ethanol-water.

One part by weight of the so-obtained N-carbobenzoxy-S-benzyl-L-cysteinyl-L-tyrosyl-valine and 1 part by weight of L-glutaminyl-L-asparaginyl-S-benzyl - L - cysteinyl-L-prolyl-L-leucylglycinamide are heated together with 1 part by weight of tetraethylpyrophosphite and 3 parts by weight of diethylphosphite to 100° for 1 hour. The resultant nonapeptide is precipitated with ether, purified by reprecipitation from its solution in dimethyl-formamide, by the addition of ethyl acetate, and then washed as set forth in Example 1, end of section (e). Further working up is as described in Example 1, section (f).

EXAMPLE 3

The procedure set forth in the first paragraph of Example 2 is followed, and the N-carbobenzoxy-S-benzyl-L-cysteinyl-L-tyrosyl - L - valine is condensed with L-glutaminyl-L-asparaginyl-S-benzyl - L - cysteinyl-L-prolyl-L-leucyl-glycinamide by allowing a solution of equimolecular quantities of the two substances and of dicyclohexylcarbodiimide in dimethylformamide to stand for 24 hours at 20°, the so-obtained nonapeptide being purified after the manner set forth in Examples 2 and 1. The nonapeptide is further worked up as set forth in Example 1, section (f).

EXAMPLE 4

The procedure set forth in Example 1, sections (a), (b) and (c) is repeated. Thereupon a solution of equimolecular quantities of N-benzenesulfonyl-S-benzyl-L-cysteine, L-tyrosine-methylester and dicyclohexylcarbodiimide in tetrahydrofurane is allowed to stand for 6 hours at 20°, the solution then evaporated to dryness, and the residue taken up in ethyl acetate. To the so-obtained solution—after it has been washed with dilute hydrochloric acid and with dilute aqueous ammonia and dried over sodium sulfate—petroleum ether is added to precipitate N-benzenesulfonyl-S-benzyl-L-cysteinyl - L - tyrosine-methylester which, after recrystallization from ethanol-water, is saponified to the free acid by standing for one hour at 20° in a 1-normal solution of sodium hydroxide in 75% methanol. Acidification of the solution yields N-benzenesulfonyl-S-benzyl-L-cysteinyl-L-tyrosine in a yield of 60%.

This product is condensed, as described in Example 1, section (d), with L-valine-methylester to yield the N-benzenesulfonyl-S-benzyl-L-cysteinyl-L-tyrosyl-L - valine-methylester which, as described in Example 1, sections (e) and (f), or in Example 2 for the N-carbobenzoxy derivative, is further worked up to the polypeptide Compound I product.

EXAMPLE 5

The procedure is as set forth in Example 4, but replacing N-benzene-sulfonyl-S-benzyl-L-cysteine by N-carbophenoxy-S-benzyl-cysteine, and the same product I is obtained as in the preceding examples.

EXAMPLE 6

The procedure is as set forth in Example 4, but replacing N-benzene-sulfonyl-S-benzyl-L-cysteine by N-carbo-p-bromo-benzoxy-S-benzyl-cysteine, and the same product I is obtained as in the preceding examples.

EXAMPLE 7

The procedure set forth in Example 1, sections (a), (b) and (c) is followed. Then S-p-bromo-benzyl-L-cysteine is treated in the presence of 2-normal sodium hydroxide solution with carbobenzoxy chloride, according to the methods described by M. Bergmann and L. Zervas, Ber. 65, 1192 (1932), for the synthesis of N-carbobenzoxy derivatives of the amino acids. One equivalent of the resutlant N-carbobenzoxy-S-p-bromo-benzyl-L-cysteine is dissolved in diethylphosphite, 2 equivalents of tetraethylpyrophosphite and 1 equivalent of L-tyrosine-methylester are added to the resultant solution, and the mixture is heated to 80° for one hour. By the addition of ether, the N-carbobenzoxy-S-p-bromo-benzyl-L-cysteinyl-L-tyrosine-methylester is precipitated, and this is filtered off, dissolved in ethyl acetate, the solution washed with dilute hydrochloric acid and with dilute ammonia and then dried. Upon the addition of petroleum ether to the solution, the ester separates out in crystalline form. With the aid of 1-normal caustic soda solution, it is saponified in 75% dioxane to the N-carbobenzoxy-S-p-bromo-benzyl-L-cysteinyl-L-tyrosine which is condensed with L-valine-methylester to the N-carbobenzoxy-S-p-bromo-benzyl-L-cysteinyl-L-tyrosyl-L-valine-methylester, after the manner described in Example 1, section (d). This product is worked up to the desired final I product, after the manner described in Example 1, sections (e) and (f) or in Example 2 for the corresponding S-benzyl derivative.

EXAMPLE 8

The procedure according to Example 7 is followed except that S-phenyl-L-cysteine is employed instead of S-p-bromo-benzyl-L-cysteine. The identical product is obtained.

EXAMPLE 9

The procedure according to Example 7 is followed except S-tolyl-L-cysteine is employed instead of S-p-bromo-benzyl-L-cysteine. The identical product is obtained.

EXAMPLE 10

N-carbobenzoxy-L-glutaminyl - L - asparaginyl - S - p - bromo-benzyl-L-cysteine-azide is prepared according to the procedure described in Example 1, section (f), employing S-p-bromo-benzyl-L-cysteine instead of the corresponding S-benzyl derivative. The N-carbobenzoxy-L-glutaminyl-L-asparaginyl-S-p-bromo-benzyl - L - cysteine-azide is then condensed after the manner described in section (c) of Example 1, with L-prolyl-L-leucyl-glycinamide (prepared according to Example 1 (a)), to obtain L-glutaminyl-L-asparaginyl-S-p - bromo - benzyl - L - cysteinyl-L-prolyl-L-leucyl-glycinamide. This hexapeptide derivative is then worked up according to any of the preceding examples to the identical product I.

Having thus disclosed the invention, what is claimed is:

1. The compound corresponding to the formula

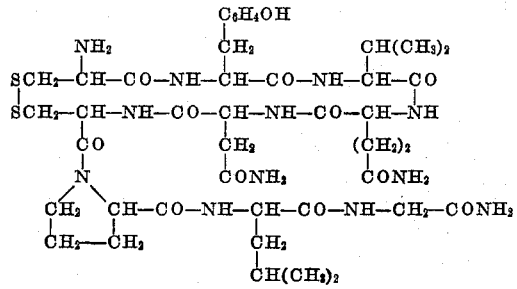

2. In a process for the preparation of the compound of the formula

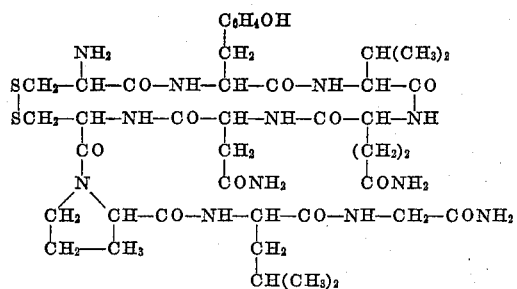

the step of condensing N—R'—S—R"—L-cysteinyl-L-tyrosine, wherein R' is a substituent which is readily split off and which functions to stabilize the amino group and is selected from the group consisting of the carbobenzoxy, carbo-p-bromo-benzoxy, carbophenoxy and benzenesulfonyl groups, and R" is a substituent which is readily split off and which protects the sulfhydryl group and is selected from the group consisting of the benzyl, p-bromobenzyl, phenyl and tolyl groups, with a member selected from the group consisting of L-valine and L-valine-lower alkyl esters.

3. In a process for the preparation of the compound of the formula

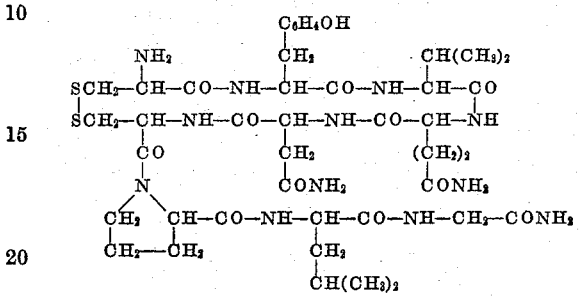

the step of condensing N—R'—S—R"—L-cysteinyl-L-tyrosyl-L-valine-azide with L - glutamyl - L - asparaginyl-S—R"—L - cysteinyl - L - prolyl-L - leucyl - glycinamide, wherein R' is a member selected from the group consisting of the carbobenzoxy, carbo-p-bromo-benzoxy, carbophenoxy and benzenesulfonyl groups, and R" is a member selected from the group consisting of the benzyl, p-bromobenzyl, phenyl and tolyl groups.

References Cited in the file of this patent

Du Vigneaud et al.: J. A. C. S., vol. 75 (1953), page 4879.

Schmidt: Chemistry of the Amino Acids and Proteins (1938), page 254.

Carpenter: Journ. Franklin Inst., July 1941, page 76.

UNITED STATES PATENT OFFICE
CERTIFICATE OF CORRECTION

Patent No. 2,854,443                                          September 30, 1958

Roger Boissonnas et al.

It is hereby certified that error appears in the printed specification of the above numbered patent requiring correction and that the said Letters Patent should read as corrected below.

Column 1, line 63, formula (III), for the right-hand portion of the formula reading "$-COOC_2C_6H_5$" read -- $-COOCH_2C_6H_5$ --; column 3, line 21, for "dipeptic" read -- dipeptide --; line 34, for "sulfyhydryl" read -- sulfhydryl --; line 60, for "carbobenzoxy" read -- carbophenoxy --; column 4, line 6, for "degree" read -- degrees --.

Signed and sealed this 12th day of May 1959.

(SEAL)
Attest:

KARL H. AXLINE

Attesting Officer

ROBERT C. WATSON
                                                     Commissioner of Patents